United States Patent Office 3,753,978
Patented Aug. 21, 1973

3,753,978
PYRAZOLINE DERIVATIVES
Klaus Adelsberger, Ludwigshafen, Erwin Hahn, Viernheim, and Horst Scheuermann, Ludwigshafen, Germany, assignors to Badische Anilin- & Soda-Fabrik Aktiengesellschaft, Ludwigshafen (Rhine), Germany
No Drawing. Filed Jan. 2, 1970, Ser. No. 419
Claims priority, application Germany, Jan. 4, 1969,
P 19 00 349.7
Int. Cl. C07d 49/10
U.S. Cl. 260—239.9    4 Claims

ABSTRACT OF THE DISCLOSURE

Diphenylpyrazoline derivatives having a 5-carboxylic ester or amide group which are useful as optical brighteners for textile material of natural or synthetic fibers.

---

This invention relates to pyrazoline derivatives having the general Formula I:

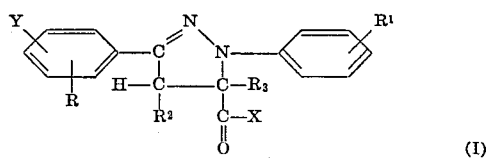

in which

R denotes a hydrogen, chlorine or bromine atom, a methyl, methoxy, ethoxy, acetylamino, methylsulfonylamino or acetoxy group;

$R^1$ denotes a hydrogen, chlorine or bromine atom or a methyl, ethyl, carboxyl, carboxylic ester, amide, N-substituted amide, nitrile, sulfonic acid, sulfonyl, sulfonic acid ester, sulfonamide or N-substituted sulfonamide group;

$R^2$ denotes a hydrogen atom or a methyl, carboxylic ester, amide or N-substituted amide group;

$R^3$ denotes a hydrogen atom or a methyl group;

Y denotes a hydrogen or chlorine atom; and

X denotes a hydroxy, alkoxy, aralkoxy, aroxy, amino or N-substituted amino group.

The radical $R^1$ contains up to ten carbon atoms.

Examples of substituents $R^1$ (other than those already mentioned are: carbomethoxy, carboethoxy, carbobutoxy, carbo-(β-hydroxy)-ethoxy, carbo-(β-methoxy)-ethoxy, carbo-(β-acetoxy)-ethoxy, carbo-(β-chloro)-ethoxy, carbo-(β-dimethylamino)-ethoxy, carbo-(β-diethylamino)-ethoxy, carbo-(β-dibutylamino)-ethoxy, carbo-(β-hydroxy)-propoxy, carbocyclohexyloxy, carbobenzyloxy, carbo-(β-phenyl)-ethoxy, carbophenoxy, carbo-(p-chloro)-phenoxy, carbo-(p-methyl)-phenoxy, carbo-(p-methoxy)-phenoxy, N-methylamide, N-ethylamide, N-butylamide, N-β-hydroxyethylamide, N-β-chloroethylamide, N-β-aminoethylamide, N-γ-methoxypropylamide, N-γ-dimethylaminopropylamide, N-β-hydroxypropylamide, N-phenylamide, N,N-dimethylamide, N,N - diethylamide, N,N - di-(β-hydroxy)-ethylamide, N - methyl - N-β-hydroxyethylamide, carboxylic piperidide, carboxylic morpholide, carboxylic piperazide, phenyl sulfonic esters, N-methylsulfonamide, N-ethylsulfonamide, N-butylsulfonamide, N - β - hydroxyethylsulfonamide, N - β-chloroethylsulfonamide, N-β-aminoethylsulfonamide, N - γ - methoxypropylsulfonamide, N-γ-dimethylaminopropylsulfonamide, N - β - hydroxypropylsulfonamide, N - phenylsulfonamide, N,N - dimethylsulfonamide, N,N-diethylsulfonamide, N,N-di-(β-hydroxyethyl) sulfonamide, N-methyl-N-β-hydroxyethylsulfonamide, N-methyl-N-phenylsulfonamide, sulfonic acid piperidide, sulfonic acid piperazide, sulfonic acid morpholide, ethylsulfonyl, β-methoxy-, β-ethoxy-, β-butoxy-, β-dimethylamino- or β-dibutylaminoethylsulfonyl.

Examples of $R^2$ (in addition to hydrogen and methyl) are carbomethoxy, carboethoxy, carbobutoxy, carbophenoxy and the amide radicals specified for $R^1$.

The total number of carbon atoms in the radicals X is up to 10.

Examples of X (in addition to hydroxy) are:

$OCH_3$, $OC_2H_5$, $OC_3H_7$, $OC_4H_9$, $OCH_2-CH=CH_2$, $O-\langle H \rangle$, $O-CH_2-CH-C_4H_9$, $O-CH_2-C_6H_5$, $OCH_2-CH_2-C_6H_5$,
    $|$
    $C_2H_5$ $O-C_6H_5$, $O-C_6H_4-Cl(p)$, $O-C_6H_4-CH_3(p)$, $O-C_6H_4-OCH_3(p)$,
$O-C_2H_4-Cl$, $O-C_2H_4-OH$, $O-C_2H_4-OCH_3$,
$O-C_2H_4-OCOCH_3$, $O-CH_2-CH-CH_3$, $O-CH_2-CH_2-N(C_2H_5)_2$
                              $|$
                              $OH$ $O-CH_2-CH_2-N(CH_3)_2$, $O-CH_2-CH_2-N(C_4H_9)_2$,
$O-CH-CH_2-N(CH_3)_2$, $O-(C_2H_4O)_2-CH_3$, $NH_2$, $NHCH_3$,
    $|$
    $CH_3$ $NHC_2H_5$, $NHC_3H_7$, $NHC_4H_9$, $NH-CH_2-CH-C_4H_9$,
                                          $|$
                                          $C_2H_5$ $O-CH_2-CH_2-OSO_3H$, $NH-CH_2-C_6H_5$, $NH-C_6H_5$,
$NH-C_2H_4-OH$, $NH-C_2H_4-NH_2$, $NH-CH_2-CH_2-NH-SO_3H$,
$NH-C_2H_4-Cl$, $NH-C_2H_4-OCH_3$, $NH-CH_2-CH_2-CH_2-OCH_3$,
$NH-CH_2-CH_2-CH_2-N(CH_3)_2$, $N(CH_3)_2$, $N(C_2H_5)_2$, $N(C_4H_9)_2$,
$CH_3-N-C_2H_4-OH$, $N(C_2H_4-OH)_2$,
$NH-CH_2-CH_2-CH_2-N(C_2H_5)_2$, $NH-CH_2-CH_2-CH_2-N\langle H \rangle$,
                       $|$
                       $CH_3$ $NH-CH_2-CH_2-CH_2-N\langle \rangle N-CH_3$, $N\langle H \rangle$, $N\langle H \rangle O$, $N\langle H \rangle NH$, $N\langle \rangle N-CH_3$ or $N\langle \rangle N-SO_3H$ The new compounds are colorless to yellowish substances which are outstandingly suitable as optical brighteners, particularly for textile material of natural and synthetic fibers, above all for fibers of polyamides, such as wool, silk, nylon 6 and nylon 6,6, secondary cellulose acetate, cellulose triacetate, polyesters and acrylonitrile polymers.

A group of brighteners which are particularly valuable industrially have the General Formula II:

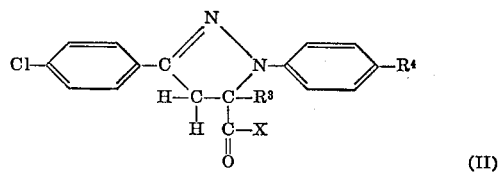
(II)

in which $R^4$ denotes a hydrogen atom or a carboxylic ester, amide, N-substituted amide, sulfonic acid, alkylsulfonyl, sulfonamide or N-substituted sulfonamide group and $R^3$ and X have the meanings given above. Particularly suitable N-substituted amide and sulfonamide groups are N-monosubstituted or N,N-di-substituted amide and sulufonamide groups.

Of these substances, those compounds are preferred in which $R^4$ denotes a sulfonic acid or a sulfonamide group (including a N-substituted sulfonamide group).

Examples of preferred radicals X are: alkoxy radicals having one to four carbon atoms or radicals derived from aliphatic amines and having a total of one to eight carbon atoms.

The new compounds may be prepared for Example by adding onto a nitrilimine having the General Formula III:

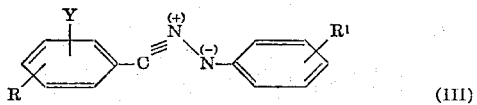

an unsaturated compound having the general Formula IV:

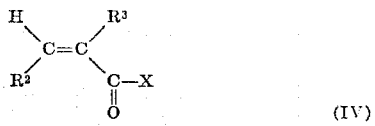

Production of nitrilimines and adding on the unsaturated compound are described for example in Tetrahedron 17 (1962), 3.

Compounds having the Formula V:

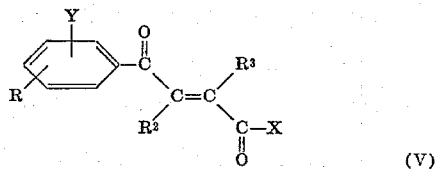

may also be reacted with phenylhydrazine having the Formula VI:

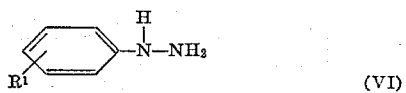

This reaction may be carried out particularly smoothly by adding on hydrogen halide to compounds having the Formula V in which X denotes OH and then allowing phenylhydrazines having the Formula VI to act thereon.

By adding on hydrogen halide, preeferably as a gas in glacial acetic acid or propionic acid, compounds having the general Formula VII:

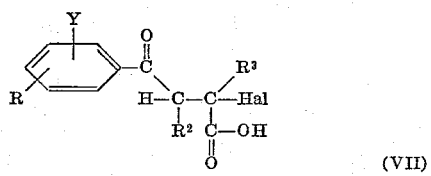

in which Hal denotes a chlorine or bromine atom are obtained from carboxylic acids having the Formula V.

After the compounds having the Formula VII have been reacted with the phenylhydrazines, the radical X may be introduced by conventional methods.

It is also possible to use the corresponding esters in the reaction with hydrogen halide instead of the carboxylic acids (X=OH).

Reaction of the Components VI and VII is advantageously carried out in solvents such as water, glacial acetic acid, propionic acid, methanol, ethanol, glycol, methylglycol, dimethylformamide, acetonitrile or N-methylpyrrolidone. The components may be reacted with each other in the solvent at a temperature of from 0° to 120° C., preferably from 40° to 80° C. The reaction period is as a rule from one to ten hours.

When R¹ denotes a sulfonic ester or sulfonamide group it is advantageous to introduce this radical into the compounds having the formula:

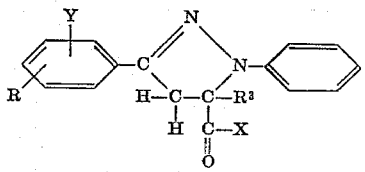

by sulfochlorination, i.e. by way of a sulfochloride group.

The invention is illustrated by the following examples. Unless stated otherwise, parts and percentages in the examples are by weight.

EXAMPLE 1

60 parts of p-chlorobenzaldehyde-α-chloro-p'-dimethylaminosulfonylphenylhydrazone is dispersed in 500 parts of toluene with an addition of 0.1 part of hydroquinone. 27.5 parts of methyl acrylate is then added and 32 parts of triethylamine is allowed to flow in within five minutes. The reaction mixture is heated for twenty minutes at 90° C., cooled and the deposited triethylamine hydrochloride is filtered off with suction. The fitrate is concentrated at subatmospheric pressure. 42 parts of 1-(p'-dimethylaminosulfonylphenyl) - 3 - (p-chlorophenyl)-pyrazoline-Δ²-5-carboxylic methyl ester having a melting point of 173° to 175° C. is obtained having the formula:

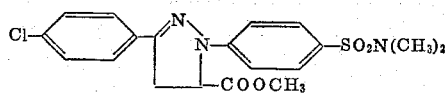

EXAMPLE 2

130 parts of benzaldehyde-α-chloro-p-dimethylaminosulfonylphenylhydrazone is dispersed in 2000 parts of toluene and 110 of acrylamide is added. 121 parts of triethylamine is allowed to flow in within five minutes and the whole is heated for five hours at 80° C. The greater part of the solvent is then removed under subatmospheric pressure, the residue is suction filtered and treated at 20° C. with 500 parts of water to remove triethylamine hydrochloride. Another suction filtration gives 104 parts of 1-(p-dimethylaminosulfonylphenyl) - 3 - phenylpyrazoline-Δ²-5-amide (melting point 232° to 235°) having the formula:

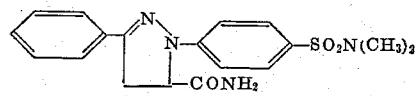

EXAMPLE 3

20 parts of 1-(p-dimethylaminosulfonylphenyl)-3-(p'-chlorophenyl) - pyrazoline - Δ² - 5 - carboxylic methyl ester in 60 parts of N,N-dimethyl-1,3-diaminopropane has 0.1 part of sodium methylate added to it and the whole is heated for three hours at 80° C. The reaction product is precipitated with 300 parts of water. 18.5 parts of 1-(p-dimethylaminosulfonylphenyl) - 3 - (p' - chlorophenyl)-pyrazoline-Δ²-5-carboxylic - (γ - N,N - dimethylaminopropyl)amide having the melting point 138° to 140° C. is obtained which has the formula:

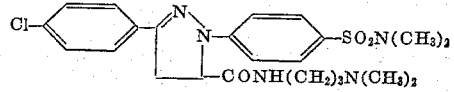

EXAMPLE 4

40 parts of 1-(p-N-methyl-N-phenylaminosulfonyl)-phenyl)-3-phenylpyrazoline-Δ²-5-carboxylic methyl ester and 0.1 part of sodium methylate are heated for four hours at 80° C. in 120 parts of ethanolamine. The reaction solution is then poured into 500 parts of water and the deposited precipitate is suction filtered and washed with water. 42 parts of 1-(p-N-methyl-N-phenylaminosulfonyl)-phenyl-3-phenylpyrazoline - Δ² - 5 - carboxylic-β-hydroxyethylamide having a melting point of 191° to 193° C is obtained which has the formula:

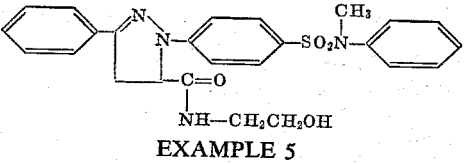

EXAMPLE 5

41 parts of o,p-dichlorobenzaldehyde - α - chloro-p'-(dimethylaminosulfonyl) - phenylhydrazone, 0.1 part of hydroquinone and 27 parts of β-chloroethyl acrylate are dissolved in 300 parts of toluene at 90° C. Then within five minutes 20 parts of triethylamine is allowed to flow in and the whole is heated for another twenty minutes at 90° C. The reaction mixture is externally cooled with ice-water and the deposited precipitate is suction filtered. The precipitate is then stirred with 200 parts of water and again filtered with suction. 40 parts of 1-(p'-dimethylaminosulfonylphenyl) - 3' - (o,p-dichlorophenyl)-pyrazoline-Δ²-5-carboxylic-β-chloroethyl ester having a melting point of 152 to 154° C. is obtained which has the formula:

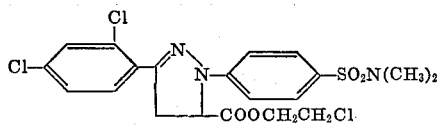

Another 6 parts of the compound is recovered by concentrating the toluene solution and grinding it with 2 parts of methanol.

EXAMPLE 6

50 parts of p-chlorobenzaldehyde-α-chloro-p'-(morpholinosulfonyl)-phenylhydrazone, 0.3 part of hydroquinone and 27 parts of allyl acrylate are heated to 90° C. Then within five minutes 24 parts of triethylamine is allowed to flow in and the reaction mixture is stirred at 90° C. for another twenty minutes and cooled. The deposited triethylamine hydrochloride is suction filtered and the filtrate is concentrated at subatmospheric pressure to one quarter of its original volume. 48 parts of 1-(p' - morpholinosulfonylphenyl) - 3 - (p - chlorophenyl)-pyrazoline-Δ²-5-carboxylic allyl ester having the melting point 126° to 129° C. is obtained by suction filtration; it has the formula:

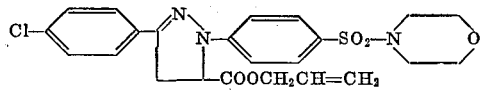

EXAMPLE 7

100 parts of 1-(p-morpholinosulfonylphenyl) - 3 - (p'-chlorophenyl)-pyrazoline-Δ²-5-carboxylic methyl ester, 0.5 part of p-toluenesulfonic acid and 150 parts of N,N-diethyl-β-aminoethanol are dissolved in 250 parts of dimethylformamide at 120° C. The reaction mixture is then kept at this temperature for twelve hours, a weak stream of nitrogen being passed through the apparatus so that the methanol formed is removed. The mixture is then cooled to 60° to 80° C. and poured into a solution of 65 parts of glacial acetic acid in 4000 parts of water. After the whole has been stirred for twenty minutes the precipitate is suction filtered and washed with 1000 parts of water. 92 parts of 1-(p-morpholinosulfonylphenyl)-3-(p'-chlorophenyl)-pyrazoline-Δ²-5-carboxylic - (β - N,N - diethylaminoethyl) ester having a melting point of 102° to 105° C. is obtained; it has the formula:

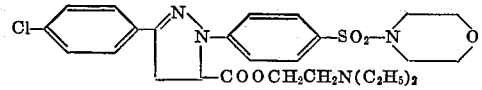

EXAMPLE 8

100 parts of 1-(p-morpholinosulfonylphenyl) - 3 - (p'-chlorophenyl)-pyrazoline-Δ²-5-carboxylic methyl ester, 0.5 part of sodium methylate and 150 parts of 1,2-diaminoethane are introduced into 2500 parts of toluene at 90° C. A weak stream of nitrogen is passed through the solution which is heated for ten hours at 90° C. It is then cooled with ice-water and the deposited precipitate is suction filtered and washed with 30 parts of methanol. 90 parts of 1 - (p-morpholinosulfonylphenyl)-3-(p'-chlorophenyl)-Δ²-5-carboxylic-(β-aminoethyl)-amide having a melting point of 214° to 216° C. is obtained which has the formula:

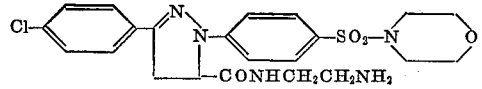

EXAMPLE 9

192 parts of p-chlorobenzaldehyde - α - chloro-(p'-carbethoxyphenyl)hydrazone having the formula:

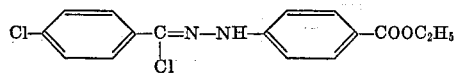

and 78.6 parts of methyl acrylate are heated to 80° C. in 900 parts of toluene to dissolve them. 92.4 parts of triethylamine is allowed to flow in within five minutes and heating at 80° C. is continued for another two hours and at 90° C. for another thirty minutes. The cooled reaction mixture is freed from precipitated triethylamine hydrochloride by suction filtration and the filtrate is concentrated at subatmospheric pressure. The residue is stirred with 70 parts of methanol at 0° C. On suction filtration, 146 parts of 1-(p'-carbethoxyphenyl)-3-(p-chlorophenyl)-pyrazoline-Δ²-5-carboxylic methyl ester is obtained having a melting point of 137° to 139° C.; it has the formula:

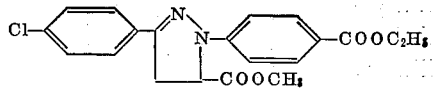

EXAMPLE 10

26 parts of p'-chlorobenzaldehyde - α - chloro-(p-carbethoxyphenyl)-hydrazone, 0.2 part of hydroquinone and 16 parts of allyl acrylate are dissolved in 100 parts of toluene at 90° C. 12 parts of triethylamine is allowed to flow in within two minutes and the temperature is kept at 90° C. for another three hours. The whole is then cooled to 20° C., triethylamine hydrochloride is suction filtered and washed with 10 parts of acetone. The filtrate is concentrated under subatmospheric pressure, the residue is stirred with 10 parts of methanol and suction filtered. 18 parts of 1 - (p - carbethoxyphenyl) - 3 - (p'-chlorophenyl) - pyrazoline - Δ² - 5 - carboxylic allyl ester having a melting point of 94° to 96° C. is obtained; it has the formula:

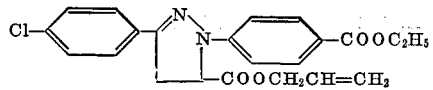

EXAMPLE 11

20 parts of 1 - (p' - carbethoxyphenyl) - 3 - (p-chlorophenyl) - pyrazoline - Δ² - 5 - carboxylic methyl ester, 50 parts of N-methylpyrrolidone-2, 30 parts of diethylamine and 0.1 part of sodium methylate are heated in a 250-cm.³ agitated autoclave for twenty-four hours at 140° C. After it has cooled, suction filtration is carried out, and the filtrate is stirred into 300 parts of water at 20° C., again suction filtered and dried. 17 parts of 1-(p'-carbodiethylaminophenyl) - 3 - (p-chlorophenyl) - pyrazoline-Δ² - 5 - carboxylic diethylamide (melting point 176° to 178° C.) is obtained having the formula:

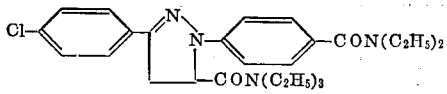

EXAMPLE 12

37 parts of p' - chlorobenzaldehyde - α - chloro-p-(N,N - dimethylaminosulfonyl) - phenylhydrazone and 28 parts of dimethyl maleate are suspended in 750 parts of toluene at 60° C. and then 20 parts of triethylamine is allowed to flow in within five minutes. After fifteen minutes at 60° C., the whole has passed into solution. It is heated at 60° C. for another four hours, then cooled and the triethylamine hydrochloride suction filtered. The filtrate is concentrated at subatmospheric pressure and the residue stirred with 10 parts of methanol. After suction filtration, 27 parts of 1 - (p - N,N - dimethylaminosulfonylphenyl) - 3 - (p' - chlorophenyl) - pyrazoline- $\Delta^2$-4,5-dicarboxylic dimethyl ester having a melting point of 154° to 157° C. is obtained; it has the formula:

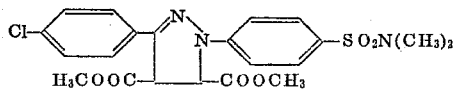

5

The compounds characterized in the following table by indication of the substituents can be prepared by methods analogous to those described in Examples 1 to 12:

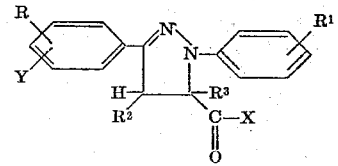

| Example | R | R¹ | R² | R³ | X | Y |
|---|---|---|---|---|---|---|
| 1 | 4-Cl | COOC₂H₅ | H | H | NH₂ | H |
| 2 | 4-Cl | COOC₄H₉ | H | H | OCH₃ | 3-Cl |
| 3 | 4-Cl | COOC₂H₅ | COOC₂H₅ | H | OC₂H₅ | H |
| 4 | 4-Cl | COOC₂H₅ | H | H | OCH₂CH=CH₂ | H |
| 5 | 4-Cl | COOC₂H₅ | H | CH₃ | NH(CH₂)₃N(CH₃)₂ | H |
| 6 | 4-Cl | CON(CH₂CH₂OH)₂ | H | H | NH₂ | H |
| 7 | 4-Cl | CONH(CH₂)₃N(CH₃)₂ | H | H | NH(CH₂)₃N(CH₃)₂ | H |
| 8 | 4-Cl | COOCH₃ | H | CH₃ | OCH₂CH=CH₂ | H |
| 9 | 4-Cl | COOCH₂CH₂OH | H | CH₃ | N(C₄H₉)₂ | H |
| 10 | 4-Cl | COOCH₂CH₂OCH₃ | H | H | NHCH₃ | H |
| 11 | 4-Cl | COOCH₂CH₂OCOCH₃ | H | H | NH₂ | H |
| 12 | 4-Cl | COOCH₂CH₂OCOCH₃ | H | H | NHC₆H₅ | H |
| 13 | 4-Cl | COOCH₂CH₂Cl | H | H | OCH₃ | H |
| 14 | 4-Cl | COOCH₂CH₂OH | H | H | NHCH₂CH₂Cl | H |
| 15 | 4-Cl | COO—⟨C₆H₅⟩ | H | H | OCH₃ | H |
| 16 | 4-Cl | COOCH₂C₆H₅ | H | H | N(C₂H₅)₂ | H |
| 17 | 4-Cl | COOC₆H₅ | H | H | ⟨N—H⟩ (morpholine/piperidine) | H |
| 18 | 4-Cl | COOC₆H₄Cl(p) | H | H | ⟨N—H⟩ | H |
| 19 | 4-Cl | COOC₆H₄CH₃(p) | H | H | ⟨N—H⟩ | H |
| 20 | 4-Cl | COOC₆H₄CH₃(p) | H | H | ⟨N—H—O⟩ | H |
| 21 | 4-Cl | COOC₆H₄OCH₃(p) | H | H | ⟨N—H—O⟩ | H |
| 22 | 4-Cl | COOC₆H₄OCH₃(p) | H | H | ⟨N—H⟩ | H |
| 23 | 4-Cl | COOC₆H₄CH₃(p) | H | CH₃ | ⟨N—H—O⟩ | H |
| 24 | 4-Cl | COOC₆H₄CH₃(p) | H | H | ⟨N—H⟩ | 3-Cl |
| 25 | 4-Cl | CONHCH₃ | H | H | OCH₃ | H |
| 26 | 4-Cl | CONHC₄H₉ | H | H | OC₄H₉ | H |
| 27 | 4-Cl | CONHCH₂CH₂OH | H | H | NHCH₂CH₂OH | H |
| 28 | 4-Cl | CONHCH₂CH₂Cl | H | H | NHCH₂CH₂CH₂N(CH₃)₂ | H |
| 29 | 4-Cl | CONHCH₂CH₂CH₂OCH₃ | H | H | NH₂ | H |
| 30 | 4-Cl | CONHCH₂CH₂CH₂OCH₃ | H | H | N(CH₃)CH₂CH₂OH | H |
| 31 | 4-Cl | CONHCH₂CH₂CH₂OH | H | H | NH₂ | H |
| 32 | 4-Cl | CONHC₆H₅ | H | H | N(C₂H₅)₂ | H |
| 33 | 4-Cl | CONHC₆H₅ | H | H | ⟨N—H⟩ | 3-Cl |
| 34 | 4-Cl | CON(CH₃)₂ | H | H | OCH₃ | H |
| 35 | 4-Cl | CON(CH₃)₂ | H | CH₃ | OCH₃ | H |
| 36 | 4-Cl | CON(C₂H₅)₂ | H | H | NHCH₂CH₂CH₂N(CH₃)₂ | H |
| 37 | 4-Cl | CON(CH₂CH₂OH)₂ | H | H | ⟨N—H—O⟩ | H |
| 38 | 4-Cl | CON(CH₃)—CH₂CH₂OH | H | H | ⟨N—H—O⟩ | H |
| 39 | 4-Cl | CO—N⟨C₆H₅⟩ | H | H | ⟨N—H⟩ | H |
| 40 | 4-Cl | SO₃C₆H₅ | H | H | N(C₂H₅)₂ | H |
| 41 | 4-Cl | SO₂NHC₂H₅ | H | H | NHC₂H₅ | H |
| 42 | 4-Cl | SO₂NHC₄H₉ | H | H | NHC₄H₉ | H |
| 43 | 4-Cl | SO₂NHCH₂CH₂OH | H | H | OCH₃ | H |
| 44 | 4-Cl | SO₂NHCH₂CH₂Cl | H | H | OCH₃ | H |
| 45 | 4-Cl | SO₂NHCH₂CH₂OCH₃ | H | H | NHCH₂CH₂OCH₃ | H |
| 46 | 4-Cl | SO₂NHCH₂CH₂CH₂N(CH₃)₂ | H | H | N(C₂H₅)₂ | H |

TABLE—Continued

| Example | R | R¹ | R² | R³ | X | Y |
|---|---|---|---|---|---|---|
| 47 | 4-Cl | $SO_2NHCH_2CH_2CH_2OH$ | H | H | $N(C_2H_5)_2$ | H |
| 48 | 4-Cl | $SO_2NHCH_2CH_2CH_2OH$ | H | H | $N(C_4H_9)_2$ | H |
| 49 | 4-Cl | $SO_2NHC_6H_5$ | H | H | $NHC_6H_5$ | H |
| 50 | 4-Cl | $SO_2NHCH_2CH_2NH_2$ | H | H | $OCH_3$ | H |
| 51 | 4-Cl | $SO_2NHC_6H_5$ | $COOCH_3$ | H | $NHC_6H_5$ | H |
| 52 | 4-Cl | $SO_2NHC_6H_5$ | $COOC_4H_9$ | H | $NHC_6H_5$ | H |
| 53 | 4-Cl | $SO_2N(CH_3)_2$ | $COOCH_3$ | H | $OCH_3$ | H |
| 54 | 4-Cl | $SO_2N(CH_3)_2$ | $CONHC_2H_5$ | H | $NHC_6H_5$ | H |
| 55 | 4-Cl | $SO_2N(CH_3)_2$ | $CONHCH_2CH_2OH$ | H | $NHCH_2CH_2OH$ | H |
| 56 | 4-Cl | $SO_2N(CH_3)_2$ | $CONHCH_2CH_2CH_2N(CH_3)_2$ | H | $NHCH_2CH_2CH_2N(CH_3)_2$ | H |
| 57 | 4-Cl | $SO_2N(CH_3)_2$ | $CONHC_6H_5$ | H | $NHC_6H_5$ | H |
| 58 | 4-Cl | $SO_2N(CH_3)_2$ | $CON(C_2H_5)_2$ | H | $N(C_2H_5)_2$ | H |
| 59 | 4-Cl | $SO_2N(CH_3)_2$ | $CON(CH_2CH_2OH)_2$ | H | $N(CH_2CH_2OH)_2$ | H |
| 60 | 4-Cl | $SO_2N(CH_3)_2$ | CON(piperidinyl) | H | N(piperidinyl) | H |
| 61 | 4-Cl | $SO_2N(CH_3)_2$ | CON(morpholinyl) | H | N(morpholinyl) | H |
| 62 | 4-Cl | $SO_2N(CH_3)_2$ | H | H | $OCH_2CH=CH_2$ | H |
| 63 | 4-Cl | $SO_2N(CH_3)_2$ | H | H | $O-CH(CH_3)CH_3$ | H |
| 64 | 4-Cl | $SO_2N(CH_3)_2$ | H | H | $NH_2$ | H |
| 65 | 4-Cl | $SO_2N(CH_3)_2$ | H | H | $OCH_3$ | 2-Cl |
| 66 | 4-Cl | $SO_2N(CH_3)_2$ | H | H | $OCH_2CH_2Cl$ | H |
| 67 | 4-Cl | $SO_2N(CH_3)_2$ | H | H | $OCH_2CH_2OH$ | 2-Cl |
| 68 | 4-Cl | $SO_2N(CH_3)_2$ | H | H | $OCH_2CH_2OCOCH_3$ | 2-Cl |
| 69 | 4-Cl | $SO_2N(CH_3)_2$ | H | H | $NHCH_2CH_2OH$ | 2-Cl |
| 70 | 4-Cl | $SO_2N(CH_3)_2$ | H | H | $N(CH_2CH_2OH)_2$ | 2-Cl |
| 71 | 4-Cl | $SO_2N(CH_3)_2$ | H | H | $NHCH_2CH_2CH_2N(CH_3)_2$ | 2-Cl |
| 72 | 4-Cl | $SO_2N(C_2H_5)_2$ | H | H | $OCH_3$ | H |
| 73 | 4-Cl | $SO_2N(CH_2CH_2OH)_2$ | H | H | $NH_2$ | H |
| 74 | 4-Cl | $SO_2N(CH_3)-CH_2CH_2OH$ | H | H | $NH_2$ | H |
| 75 | 4-Cl | $SO_2N$(piperidinyl) | H | H | $NHCH_2CH_2CH_2N(CH_3)_2$ | H |
| 76 | 4-Cl | $SO_2N$(morpholinyl) | H | H | $OCH_3$ | H |
| 77 | 4-Cl | $SO_2N$(morpholinyl) | $COOCH_3$ | H | $OCH_3$ | H |
| 78 | 4-Cl | $SO_2N$(piperazinyl-NH) | H | H | $NHCH_2CH_2OH$ | H |
| 79 | 4-Cl | $SO_2N$(morpholinyl) | H | H | $N(CH_2CH_2OH)_2$ | H |
| 80 | 4-Cl | $SO_2N$(morpholinyl) | H | H | $NHCH_2CH_2NH_2$ | H |
| 81 | 4-Cl | $SO_2N$(morpholinyl) | H | H | $NHCH_2CH_2CH_2N(CH_3)_2$ | H |
| 82 | 4-Cl | $SO_2N$(piperazinyl-NH) | H | H | N(piperazinyl-NH) | H |
| 83 | H | $SO_2N(CH_3)-C_6H_5$ | H | H | $OCH_3$ | H |
| 84 | H | $SO_2N(CH_3)-C_6H_5$ | H | H | $OCH_2CH_2Cl$ | H |
| 85 | H | $SO_2N(CH_3)-C_6H_5$ | H | H | $OCH_2CH_2OH$ | H |

EXAMPLE 86

2 parts of a solution prepared from 1 part of 1-(p-dimethylaminosulfonylphenyl) - 3 - (p′ - chlorophenyl)-pyrazoline-$\Delta^2$ - 5 - carboxylic-($\gamma$-dimethylaminopropyl)-amide and 20 parts of dimethylformamide is added to a liquor containing 20 parts of formic acid and 5 parts of the reaction product of 47 moles of ethylene oxide with 1 mole of castor oil in 1000 parts of water. 20 parts of an acrylonitrile polymer cloth is treated for thirty minutes at 100° C. in the resultant liquor, rinsed in the usual way and dried. An intense brightening is obtained having good light fastness and a high whiteness peak.

EXAMPLE 87

100 parts of $\beta$-(4-chlorobenzoyl)-$\alpha$-chloropropionic acid and 85 parts of phenylhydrazine are suspended in 2000 parts of water and stirred for three hours at 60° C. The reaction mixture is allowed to cool to 20° C. After suction filtration, washing with 2000 parts of water and drying, 105 parts of 1-phenyl-3-p-chlorophenyl-$\Delta^2$-pyrazoline-5-carboxylic acid having the formula:

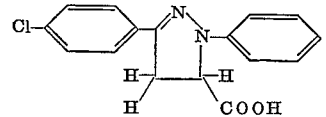

is obtained which after having been recrystallized from acetonitrile has a melting point of 156° to 158° C.

The β-(4-chlorobenzoyl)-α-chloropropionic acid used is prepared as follows:

210 parts of p-chlorobenzoylacrylic acid is suspended in 800 parts of glacial acetic acid. 100 parts of hydrogen chloride is passed into this suspension at 10° to 20°; the yellow color disappears and solution takes place. The whole is stirred for two hours at 20° C., 3000 parts of water is added and the product is suction filtered and dried. 230 parts of β-(4-chlorobenzoyl)-α-chloropropionic acid is obtained having a melting point of 127° to 130° C. It has the following structure:

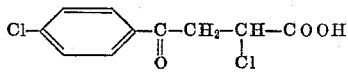

EXAMPLE 88

12 parts of β-(4-chlorobenzoyl)-α-chloropropionic acid, 18 parts of p-chlorophenylhydrazine hydrochloride and 10 parts of sodium acetate are suspended in 100 parts of glacial acetic acid. The whole is stirred for one hour at 25° C. and for two hours at 60° C. and cooled to 20° C. 200 parts of water is added and the precipitate is suction filtered, washed with 500 parts of water and dried. 16 parts of 1,3-bis-p-chlorophenyl-Δ²-pyrazoline-5-carboxylic acid is obtained which has the structure:

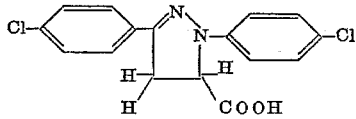

and a melting point of 163° to 167° C. After having been recrystallized from acetonitrile, the compound melts at 170° to 173° C.

EXAMPLE 89

13 parts of 1,3-bis-p-chlorophenyl-Δ²-pyrazoline-5-carboxylic acid is boiled under reflux with 80 parts of methanol and 0.5 part of concentrated sulfuric acid for 3½ hours. The cold reaction mixture is suction filtered and washed with water. 10 parts of 1,3-bis-p-chlorophenyl-Δ²-pyrazoline-5-carboxylic methyl ester is obtained having a melting point of 117° to 119° C. and the structure:

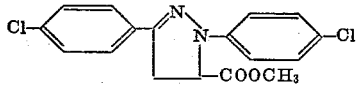

EXAMPLE 90

25 parts of β-(4-chlorobenzoyl)-α-chloropropionic acid, 25 parts of p-tolylhydrazine sulfate and 10 parts of sodium carbonate (anhydrous) in 400 parts of water are stirred for four hours at 50° C. The whole is then cooled to 20° C. After suction filtration, washing with 200 parts of water and drying, 29 parts of 1-(p-tolyl)-3-p'-chlorophenyl)-Δ²-pyrazoline-5-carboxylic acid is obtained having the melting point 202° to 205° C. and the structure:

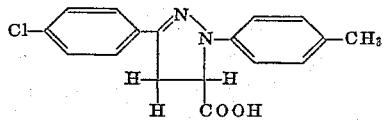

EXAMPLE 91

20 parts of β-(4-chlorobenzoyl)-α-chloropropionic acid and 24 parts of p-hydrazinobenzoic acid in 150 parts of glacial acetic acid are heated to 55° C. 250 parts of water is added to the hot solution which is cooled to 20° C. The deposited product is suction filtered, washed with 300 parts of water and dried. 25 parts of 1-p-carboxyphenyl-3-p'-chlorophenyl-Δ²-pyrazoline-5-carboxylic acid is obtained which has a melting point of 273° to 276° C. and the structure:

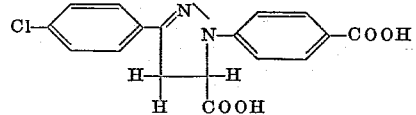

EXAMPLE 92

6 parts of 1-phenyl-3-p-chlorophenyl-Δ²-pyrazoline-5-carboxylic methyl ester is introduced in portions at 10° to 20° C. into 30 parts of chlorosulfonic acid and stirred for two hours at 20° C. The sulfochloride formed is precipitated with 200 parts of ice-water, suction filtered and dissolved while moist in 50 parts of chloroform. 17 parts of morpholine is added and the whole is boiled under reflux for two hours. The solvent is then distilled off and the residue is washed with 100 parts of water and dried. 5 parts of 1-p-morpholinosulfonylphenyl-3-p'-chlorophenyl-Δ²-pyrazoline-5-carboxylic methyl ester is obtained having the structure:

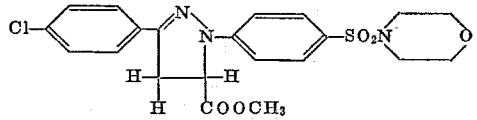

After recrystallization from acetonitrile, it has a melting point of 202° to 206° C.

The pyrazoline carboxylic ester is prepared from the pyrazoline carboxylic acid (Example 87) in a manner analogous to Example 89. The ester has a melting point of 105° to 107° C.

EXAMPLE 93

25 parts of β-(4-chlorobenzoyl)-α-chloropropionic acid, 28 parts of p-hydrazinobenzenesulfonic morpholide and 8 parts of sodium acetate in 150 parts of glacial acetic acid are stirred for one hour at 20° C. and for two hours at 55° C. 300 parts of water is added and the whole is allowed to cool to 20° C., filtered, washed with 150 parts of water, dried and 41 parts of 1-(p-morpholinosulfonylphenyl)-3-(p'-chlorophenyl)-Δ²-pyrazoline-5-carboxylic acid is obtained. The acid is dissolved in 240 parts of methanol, 1 part of concentrated sulfuric acid is added and the whole is boiled for seven hours under reflux. The solvent is distilled off and the residue is washed with water and dried. 37 parts of the carboxylic methyl ester having the formula:

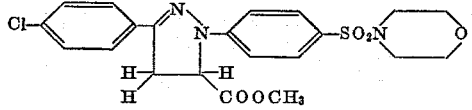

is obtained which after having been recrystallized from acetonitrile melts at 204° to 206° C. and is identical with the product obtained in Example 92.

EXAMPLE 94

40 parts of 1-p-dimethylaminosulfonylphenyl-3-p'-chlorophenyl - Δ² - pyrazoline-5-carboxylic methyl ester, 0.1 part of sodium methylate and 120 parts of 1,2-diaminoethane are heated for six hours at 80° C. under nitrogen. The whole is allowed to cool and is stirred into 250 parts of water so that the product crystallizes. 38 parts of amide is obtained having the melting point 208° to 211° C. and the structure:

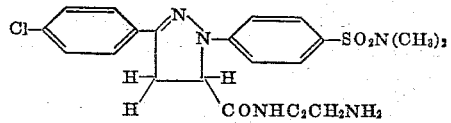

The ester may be obtained analogously to Example 93 from β-(4-chlorobenzoyl)-α-chloropropionic acid and p-hydrazinobenzenesulfonic dimethylamide followed by esterification of the pyrazoline-carboxylic acid formed, or by sulfochlorination and aminolysis of 1-phenyl-3-p-chlorophenylpyrazoline-5-carboxylic ester analogous to Example 92.

EXAMPLE 95

50 parts of 1-p-morpholinosulfonylphenyl-3-p'-chlorophenyl-$\Delta^2$-pyrazoline-5-carboxylic methyl ester prepared according to Example 92, 0.1 part of sodium methylate and 170 parts of N,N-dimethylpropylenediamine-1,3 are heated for four hours at 90° C. The whole is allowed to cool and stirred into 400 parts of water. After filtering off and washing the precipitate with 400 parts of water and drying, 51 parts of 1-p-morpholinosulfonylphenyl-3-p'-chlorophenyl-$\Delta^2$-pyrazoline - 5 - carboxylic($\alpha$-dimethylaminopropyl)amide is obtained having a melting point of 222° to 224° C. and the structure:

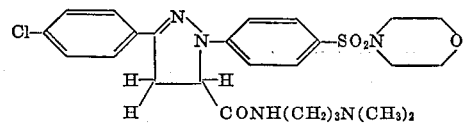

EXAMPLE 96

35 parts of hydrogen chloride is passed at 10° to 20° C. into a solution of 27 parts of p-mesylaminobenzoylacrylic acid having the formula:

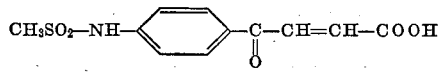

in 130 parts of glacial acetic acid and the whole is allowed to stand overnight. 21 parts of $\beta$-4-methylsulfonylaminobenzoyl)-$\alpha$-chloropropionic acid is precipitated having a melting point of 178° to 182° C. and the formula:

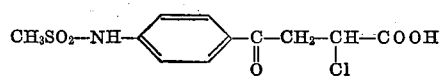

15 parts of this compound is dissolved hot in 100 parts of glacial acetic acid, 10 parts of phenylhydrazine is added and the whole is stirred for two hours at 50° C. 200 parts of water is then allowed to flow in, stirring is continued for thirty minutes and the precipitate is filtered and washed with 100 parts of water. 18 parts of 1-phenyl-3 - (p - methylsulfonylaminophenyl) - $\Delta^2$ - pyrazoline-5-carboxylic acid is obtained having a melting point of 193° to 196° C. and the formula:

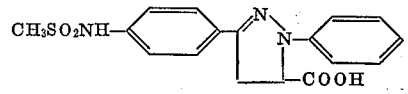

EXAMPLE 97

20 parts of phenylhydrazine-4-sulfonic acid and 9 parts of sodium hydrogen carbonate are dissolved in 200 parts of hot water. Then 25 parts of $\beta$-(4-chlorobenzoyl)-$\alpha$-chloropropionic acid is introduced into this solution at 70° C. The whole is stirred for another 2½ hours at 70° C., 70 parts of sodium chloride is added, and the whole is cooled to 15° C. and suction filtered.

37 parts of the compound having the formula:

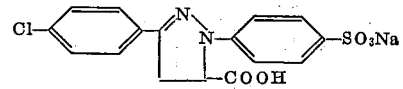

is obtained.

The compounds identified in the following table by indicating their substituents may be obtained by methods analogous to those described in Examples 87 to 97:

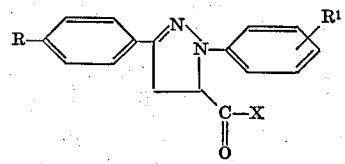

| Example | R | R¹ | X |
|---|---|---|---|
| 98 | H | 4-SO₃Na | NH—(CH₂)₃—N⟨H⟩ |
| 99 | H | 3-SO₃Na | NH—(CH₂)₃—N(C₂H₅)₂ |
| 100 | H | 4-Cl | NH—(CH₂)₃—N⟨CH₃ / H⟩ |
| 101 | Cl | 4-CH₃ | NH—CH₂CH₂OSO₃H |
| 102 | Cl | SO₂—N⟨⟩N—CH₃ | O—CH₂CH₂OSO₃H |
| 103 | Cl | 4-Cl | O—CH₂CH₂N(CH₃)₂ |
| 104 | Cl | 4-Cl | O—CH₂CH₂—N(C₂H₅)₂ |
| 105 | Cl | 4-SO₃Na | O—CH—CH₂—N(CH₃)₂ / CH₃ |
| 106 | CH₃ | 4-SO₂—N⟨⟩O | O—C₄H₉ |
| 107 | CH₃ | 4-Cl | O—CH₂C₆H₅ |
| 108 | OCH₃ | 4-SO₂—N⟨H⟩ | O—C₆H₅ |
| 109 | OCH₃ | 4-SO₂C₆H₅ | O—CHCH₂—N(CH₃)₂ / CH₃ |
| 110 | OC₂H₅ | 4-CN | NH—(CH₂)₂—N(C₂H₅)₂ |
| 111 | CH₃CONH | 4-CONH₂ | NH—(CH₂)₃—N(CH₃)₂ |
| 112 | CH₃CONH | 3-SO₃Na | OCH₂CH₂N(C₂H₅)₂ |

TABLE—Continued

| Example | R | R¹ | X |
|---|---|---|---|
| 113 | CH₃C(=O)O— | 4-SO₂NHC₄H₉ | NH—CH₂CH₂—NHSO₃H |
| 114 | CH₃C(=O)O— | 4-SO₂—N⟨⟩N—CH₃ | O—CH₂CH₂—OSO₃H |
| 115 | Br | 4-COOC₂H₅ | O—CH₂CH₂—N(C₄H₉)₂ |
| 116 | Cl | SO₂C₂H₅ | NH(CH₂)₃N(CH₃)₂ |
| 117 | Cl | SO₂CH₂CH₂OCH₃ | OCH₂CH₂N(C₂H₅)₂ |
| 118 | Cl | SO₂CH₂CH₂OC₄H₉ | OCH₃ |
| 119 | Cl | SO₂CH₂CH₂N(CH₃)₂ | NH(CH₂)₃N(CH₃)₂ |
| 120 | Cl | SO₂CH₂CH₂N(C₄H₉)₂ | OCH₃ |
| 121 | Cl | SO₂CH₂CH₂NH(CH₂)₃N(CH₃)₂ | OCH₃ |
| 122 | Cl | SO₂CH₂CH₂OCH₂CH₂N(C₂H₅)₂ | OC₂H₅ |
| 123 | Cl | SO₂CH₂CH₂O—CH(CH₃)CH₂N(CH₃)₂ | OCH₃ |

We claim:
1. A pyrazoline having the formula

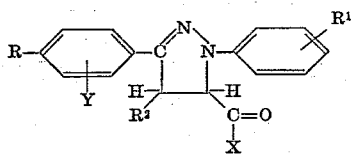

in which R is hydrogen, chlorine, bromine or methyl, R¹ is sulfonic acid, alkylsulfonyl of 1 to 4 carbon atoms, alkoxyethylsulfonyl having a total of 3 to 6 carbon atoms, dialkylaminoethylsulfonyl, said alkyl groups having 1 to 4 carbon atoms, a sulfonic acid phenyl ester, sulfonic acid amide, N-mono- or N,N-dialkyl-substituted sulfonic acid amide, and alkyl groups having 1 to 4 carbon atoms, N-mono- or N,N-dihydroxylalkyl substituted sulfonic acid amide, said hydroxyalkyl groups having 2 to 3 carbon atoms, N,N-dialkylaminopropyl sulfonic acid amide, said alkyl groups having 1 to 4 carbon atoms or one of the radicals —SO₂NHC₂H₄Cl₄, —SO₂NHC₂H₄NH₂,

—SO₂NHC₂H₄O

alkyl, the alkyl group having 1 to 4 carbon atoms,

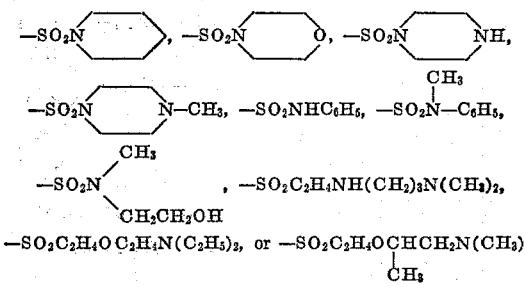

—SO₂C₂H₄OC₂H₄N(C₂H₅)₂, or —SO₂C₂H₄OCHCH₂N(CH₃)₂
                                      |
                                      CH₃

R² is hydrogen or methyl, X is hydroxy, alkoxy of 1 to 8 carbon atoms, β-hydroxyethoxy, β-hydroxypropoxy, β-methoxyethoxy, β-chloroethoxy, β-acetoxyethoxy, allyloxy, cyclohexyloxy, benzyloxy, β-phenylethoxy, phenoxy, phenoxy substituted by chlorine, methyl or methoxy, β-(β′-methoxyethoxy)-ethoxy, or β-sulfoethoxy and Y is hydrogen or chlorine.

2. A pyrazoline as claimed in claim 1 wherein R¹ is sulfonamide or N-mono- or N,N-dialkyl-substituted sulfonic acid amide, said alkyl groups having 1 to 4 carbon atoms, N-mono- or N,N-dihydroxyalkyl substituted sulfonic acid amide, said hydroxyalkyl groups having 2 or 3 carbon atoms, N,N-dialkylaminopropyl sulfonic acid amides, said alkyl groups having 1 to 4 carbon atoms or one of the radicals —SO₂NHC₂H₄Cl, —SO₂NHC₂H₄NH₂,

—SO₂NHC₂

H₄O alkyl, the alkyl group having 1 to 4 carbon atoms,

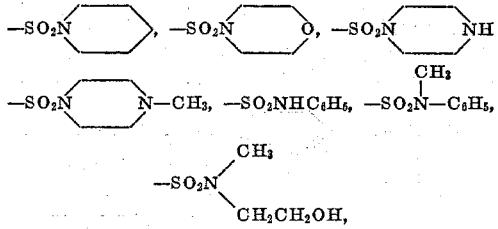

or

and X is hydroxy or alkoxy of 1 to 8 carbon atoms.

3. A pyrazoline as claimed in claim 1 wherein Y is chlorine, R is hydrogen, X is methoxy, and R¹ is N,N-dimethylsulfonamide, and R² is hydrogen.

4. A pyrazoline as claimed in claim 1 wherein R is chlorine, Y is hydrogen, R² is hydrogen, X is methoxy and R¹ is

—SO₂N⟨⟩N—CH₃

References Cited
UNITED STATES PATENTS
3,629,241  12/1971  Krause et al. _____ 260—239.9

HENRY R. JILES, Primary Examiner
C. M. S. JAISLE, Assistant Examiner

U.S. Cl. X.R.

117—33.5 T; 252—8.7, 8.75, 8.8, 301.2; 260—239.7, 239.8, 247.1, 247.2 268, 293.7, 310 D

UNITED STATES PATENT OFFICE
CERTIFICATE OF CORRECTION

Patent No. 3,753,978   Dated August 21, 1973

Inventor(s) Klaus Adelsberger et al

It is certified that error appears in the above-identified patent and that said Letters Patent are hereby corrected as shown below:

Column 2, line 65, "sulufonamide" should read -- sulfonamide --.

Column 3, line 37, "preefrably" should read -- preferably --.

Columns 9 & 10, Example 80, column "Y", insert -- H --.

Column 12, lines 66-72,

"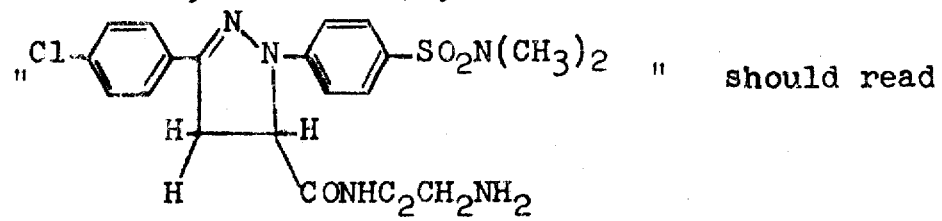"   should read

-- 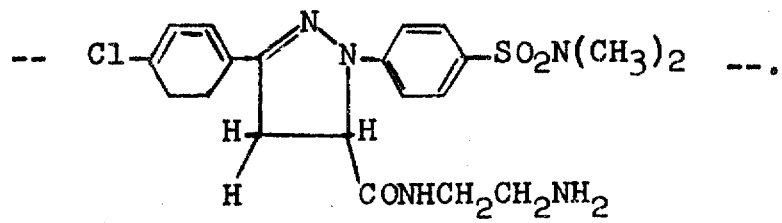 --.

Column 12, line 73, "analogous ly" should read -- analogously --

Column 15, line 41, "$SO_2NHC_2H_4Cl_4$" should read -- $SO_2NHC_2H_4Cl$ --

Signed and sealed this 19th day of November 1974.

(SEAL)
Attest:

McCOY M. GIBSON JR.   C. MARSHALL DANN
Attesting Officer   Commissioner of Patents